United States Patent [19]
Button et al.

[11] 3,877,818
[45] Apr. 15, 1975

[54] PHOTO-OPTICAL METHOD FOR DETERMINING FAT CONTENT IN MEAT

[75] Inventors: George F. Button, Port Republic; Karl H. Norris, Beltsville, both of Md.

[73] Assignee: The United States of America as represented by the Secretary of Agriculture, Washington, D.C.

[22] Filed: Jan. 28, 1974

[21] Appl. No.: 437,094

[52] U.S. Cl. ............... 356/186; 250/339; 250/340; 356/51; 356/201; 356/209
[51] Int. Cl. ........................................... G01n 21/22
[58] Field of Search ....... 356/51, 74, 186, 188, 189, 356/201, 204, 209–212; 250/338–341

[56] References Cited
UNITED STATES PATENTS
3,154,625  10/1964  Kail.................................. 356/212 X

OTHER PUBLICATIONS
Ben–Gera et al., "Direct Spectrophotometric Determination of Fat and Moisture in Meat Products," Journal of Food Science, Vol. 33, 1968, pp. 64–67.

Primary Examiner—Ronald L. Wibert
Assistant Examiner—F. L. Evans
Attorney, Agent, or Firm—M. Howard Silverstein; Max D. Hensley; William E. Scott

[57] ABSTRACT

Incandescent light exposes a meat sample to infra-red radiation which is transmitted through or reflected from the meat onto a tilting mirror which causes the respective transmitted or reflected light from the meat to pass through an interference filter at varying angles of incidence. By changing the angle of incidence of the filter, there is a change in the wavelength of radiation that passes through the filter over a narrow band width, in the infra-red spectrum. A filter is chosen for its sensitivity in the absorption band of meat fat. A detector receives light transmitted through the filter and generates an electrical signal that is processed to read out the fat content of the sample.

20 Claims, 7 Drawing Figures

PHOTO-OPTICAL METHOD FOR DETERMINING FAT CONTENT IN MEAT

The present invention relates to the measurement of fat content in meat, and more specifically to a photo-optical system and method for making this determination.

Consumers have always been concerned with the fat content of the meat they eat. Governments are becoming increasingly concerned with the fat content in meat and several governments have passed regulations regarding the maximum fat content for ground meat. For example, in the United States, hamburger, made from beef must have a fat content less than or equal to 30 percent.

Most butchers determine the fat content of the final product they sell by estimating the fat content, based on the color of the meat they grind. Needless to say, this is a rather inaccurate way of estimating fat content. Often times, the degree of accuracy depends upon the experience of the butcher.

Analytical means have been established, in the prior art, for making the determination of fat content in meat. There are several chemical techniques for making this determination. In terms of instrument techniques, there are two basic methods and related machines that are commonly used. The first instrument is an X-ray analyzer which exposes a meat sample to X-ray radiation. The degree of X-ray absorption by the sample is proportional to its fat content. A machine of this type is manufactured by Anal-Ray, Inc., a corporation in the United States. Although the technique is precise, the instrument utilized is rather expensive and is not portable. A second instrument employed for the measurement of fat content in meat utilizes the measurement of specific gravity. Based on the fact that fat has a lower specific gravity than water, a determination of fat content can be made. A machine utilizing specific gravity to measure fat content is manufactured by the American Company — Minneaspolis-Honeywell. A major problem with this type of analytical instrument is the temperature sensitivity that plagues this type of machine.

The present invention is an instrument utilizing photooptical components for measuring fat content in meat. Although the present invention may operate on a sample of meat, whether whole or ground, in the reflection mode, it is restricted to making measurements near the surface of the meat sample, and therefore, it works best with ground meat that has some degree of homogenity. In the transmittance mode, measurement is made of light passing through a meat sample. Thus, a greater averaging effect is realized. In the simplest emboidment of the invention to be described, the meat must be of one type, such as ground beef (hamburger), ground pork, ground lamb, etc. For purposes of convenience, the following discussion regarding the instrument will be directed toward its utilization with hamburger. However, it is to be clearly understood that this is merely exemplary and is in no way a limitation of the instrument.

Basically the present invention includes lamps which shine light toward a sample of ground meat. The light is transmitted through or reflected from the meat and then impinges upon a mirror undergoing tilting motion. Light reflected from the tilting mirror scans across a stationary interference filter. As light, reflected from the mirror, changes its angle of incidence with respect to the filter, the wavelength of radiation passing through the filter is varied over a narrow frequency band. By properly selecting the filter and/or by setting the filter to the proper angle to detect radiation in the fat absorption band, a signal is produced which may be processed to correspond with the fat content of the meat sample. The signal processing is in the form of a slope measurement of the meat transmittance or reflectance curve, in the fat absorption band. The significance of this processing will become more clearly understood hereinafter.

The above-mentioned objects and advantages of the present invention will be more clearly understood when considered in conjunction with the accompanying drawings, in which.

REFLECTANCE MODE

Figure 1:
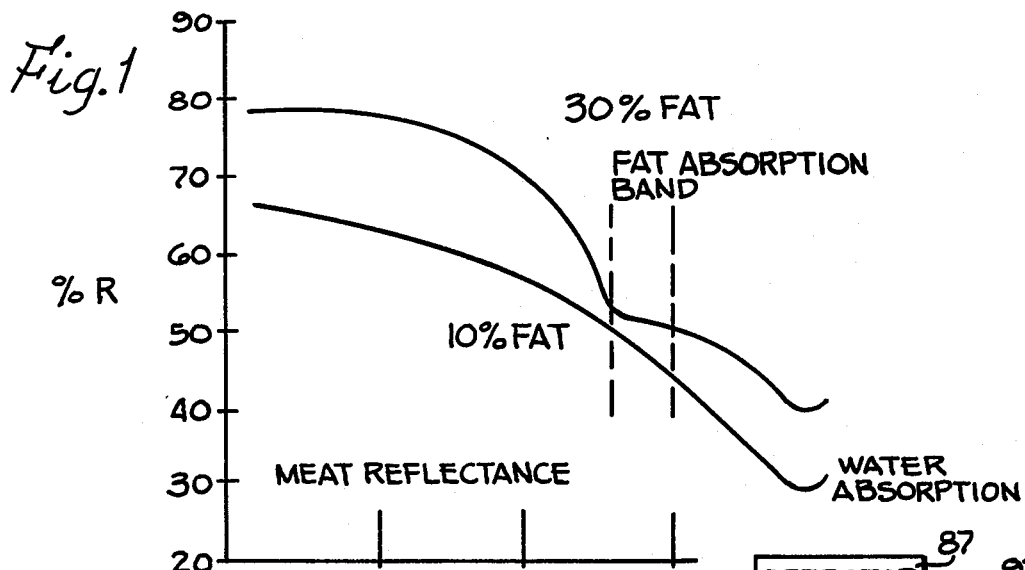
FIG. 1 is a plot of meat reflectance as a function of wavelength.

Referring to the figures and more particularly FIG. 1 thereof, two plots are shown for meat reflectance, as a function of wavelength. The ordinate axis of the plot is normalized reflectance. This is expressed as % R which is a measurement of meat reflectance compared with the reflectance of barium sulfate, used as a standard. The lower plot represents a 10 percent fat representation, while the upper plot represents a 30 percent fat representation. As will be noted, in the region of 928 nm, there is a fat absorption band. Thus, the narrow band between 928 and 950 nm is chosen for a critical measurement to determine actual fat content of a sample. It is to be emphasized that the illustrated region is not the only band within the infra-red spectrum where there is a fat absorption band. Other bands exist at 1214 nm, 1395 nm, 1430 nm, 1760 nm, 2305 nm, 2335 nm, as well as others higher in the spectrum. The band including 928 nm is chosen because suitable detectors are available, rather inexpensively. However, it should be noted that if other bands are chosen, they must be chosen where the only interference is that with water. Thus, if other substances in meat have absorption bands similar to those of other fat absorption bands, measurement at these particular bands would be unsuitable.

Several interesting facts should be observed regarding the fat absorption band indicated, as well as those just mentioned. Principally, a determination of fat content, from measurements in the fat absorption band, are independent of the color of a sample being investigated. Generally, with ground meat, as you increase the fat content, you decrease the water content and vice versa. This is a characteristic of meat and as will be explained hereinafter, is useful in generating strong measurement signals.

Figure 2:
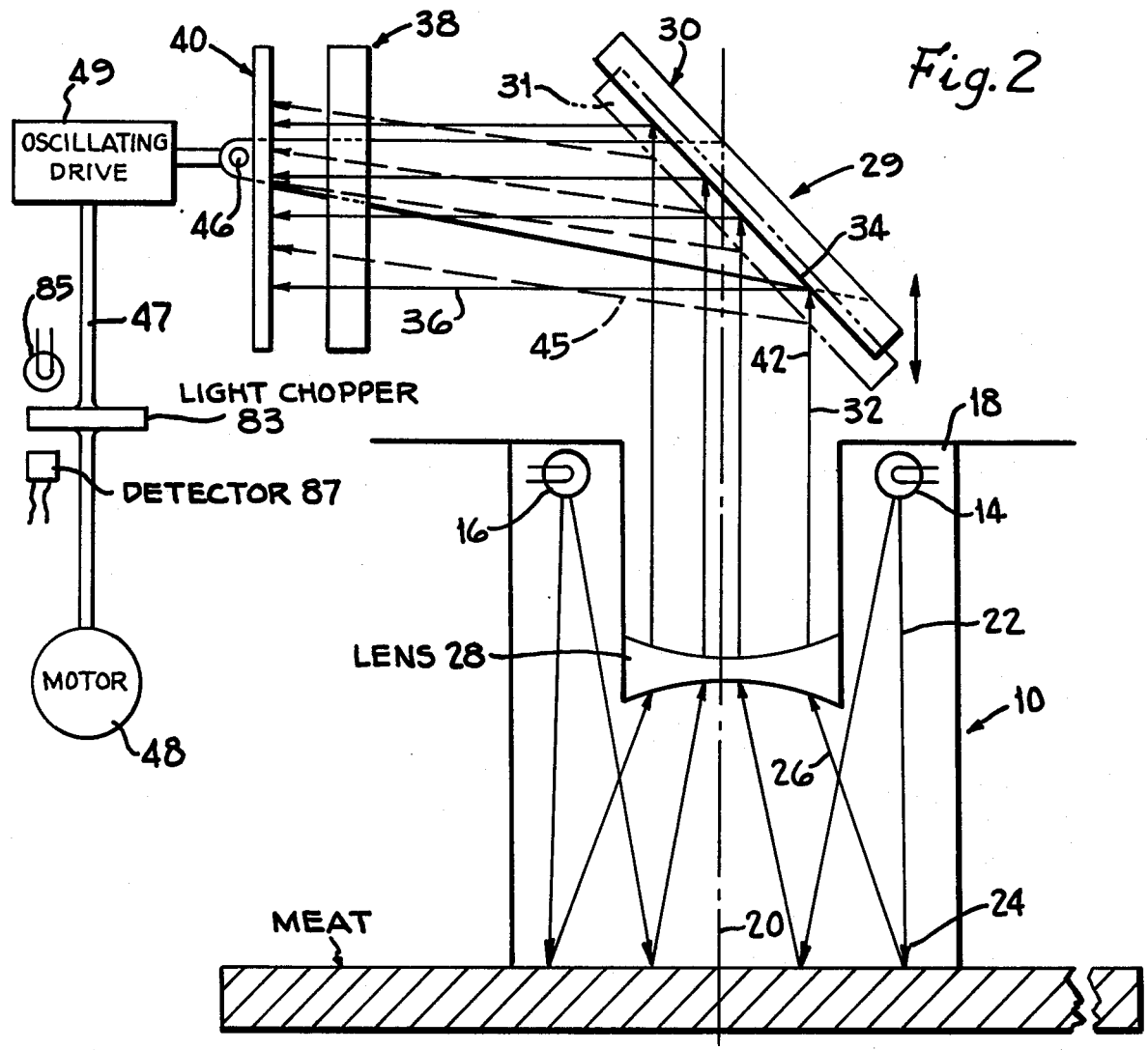
FIG. 2 is a view of the photo-optical portion of the instrument in the reflectance mode.

Referring to FIG. 2, the photo-optical portion of the present invention is illustrated. A cylindrical housing 10 includes four, symmetrically postioned lamps, of which only 2 are illustrated, namely 14 and 16. These lamps may be of the conventional flashlight type. The lamps are positioned at one transverse end of the housing 10. This end is denoted by reference numeral 18. Opposite this end is an optical opening to permit the impingement of light from the lamps onto a meat specimen or sample. The light is evenly distributed by virtue of its symmetrical location about the cylinder axis 20. As indicated, a ray of light 22 impinges, on point 24, of the meat sample. In a first embodiment, a reflection mode is employed and the reflected ray 26 is transmitted to a collimating lens 28 which converts the reflected ray 26 to a ray 32 parallel to the cylinder axis 20. As will be noticed, the collimating lens 28 produces parallel beams of reflected light from the meat sample. For purposes of convenience, only the ray 32 will be traced through the remaining photo-optical path.

Ray 32 impinges upon a mirror 29 which is disposed at an acute angular orientation relative to the axis 20. The mirror 29 actually tilts between an upper position 30 and a lower position 31, shown in dotted lines. The variation between the upper and lower position is relatively small. The ray 32 impinges upon the mirror at point 42, when the mirror is in the lower position 31. Thereafter, light is reflected from the mirror along path 45, shown in dotted lines. The interference filter 38 is interposed in the ray path of ray 45. In a similar manner, the ray 32 impinges upon point 34 of mirror 29, when the mirror is disposed in the upper position 30. When so positioned, light is reflected from the mirror along path 36 where it travels in the same general direction as the previously mentioned ray 45. The ray 36 likewise has the interference filter 38 interposed along its path. Other rays are illustrated to indicate the general beam width of the reflected light from the mirror, through the filter 38, to a back positioned silicon solar detector which is a photocell, generally indicated by reference numeral 40. The detector may be one of the type manufactured by International Rectifier Corporation.

The purpose of changing the mirror 29 between the illustrated upper and lower positions is to change the angle of incidence of light reflected from the mirror, to the filter. This changes the wavelength of the radiation passing through the filter over a narrow frequency band, which is the fat absorption band. Thus, in essence, the movement of the mirror causes a scanning across the narrow frequency band illustrated in the plot of FIG. 1. In order to achieve the motion of the mirror, a motor 48 rotates output shaft 47 which is connected to oscillating drive 49. The oscillating drive of conventional design, operates a pivot arm 44, provided between a pivot point 46 and the mirror 29. Thus, as the pivot arm 44 swings through a narrow, oscillating arc, the mirror follows thus causing the mentioned scanning effect. The end result of the instrumentation discussed, is to generate a signal from the infra-red detector 40 that is a measure of reflected energy from the meat sample. The signal generated by the detector will provide an input to measurement circuitry, to be discussed hereinafter, which measures the fat content of the meat sample.

Figure 3:
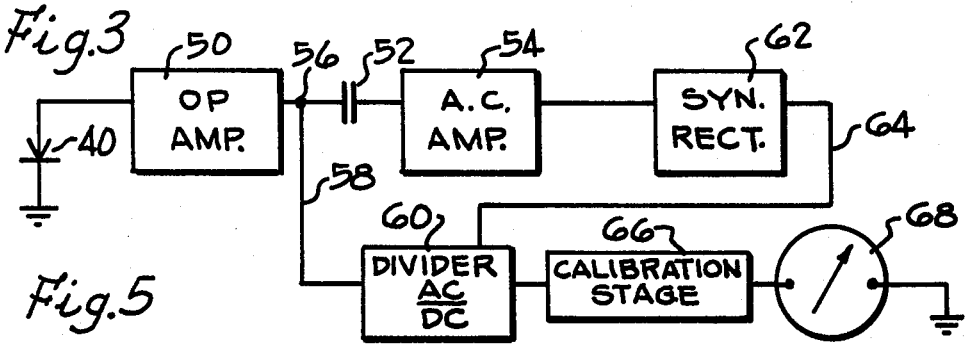
FIG. 3 is a schematic block diagram of the electronics utilized to process information generated from the detector shown in FIG. 2.

FIG. 3 represents the electronics for the present invention in block diagram form. The detector 40 generates a signal that is fed to the operational amplifier 50 which performs a current to voltage conversion. The operational amplifier is of a conventional type, with high resistive feed back. The output from the operational amplifier 50 is fed to an AC amplifier 54 through a DC blocking capacitor 52. The AC amplifier 54 performs a processing function on the signal fed to it, representing the fat absorption band. A synchronous detector or rectifier 62 receives the signal from the amplifier 54 and transmits it, via lead 64, to an AC-DC divider. The divider 60 receives its AC input from lead 64, while it receives a DC input from lead 58 that is connected to the junction point 56 at the output of the previously mentioned operational amplifier 50.

Utilization of the divider 60 is critical to the novelty of the present invention. In effect, the output from the divider is a signal to correspond with $\Delta R/R$ which is associated with the slope of the plot in the fat absorption band divided by the average value of the reflectance in that band. This ratio is of a signal form that can be fed to a meter or other read-out to demonstrate the fat content of the meat sample. Actually, the divider 60 performs an energy ratio, namely, $\Delta E_R/E_R$ which is the ratio of the slope of the plot in the fat absorption band divided by the energy reflected from the meat, both numerator and denominator of the ratio being in terms of reflected energy from the meat sample. However, this ratio is proportional to the previous ratio of reflectance. The divider 60 is followed by a calibration stage 66 which permits the calibration of a meter 68 to read-out the output from divider 60, in terms of fat content of meat.

Figure 4:
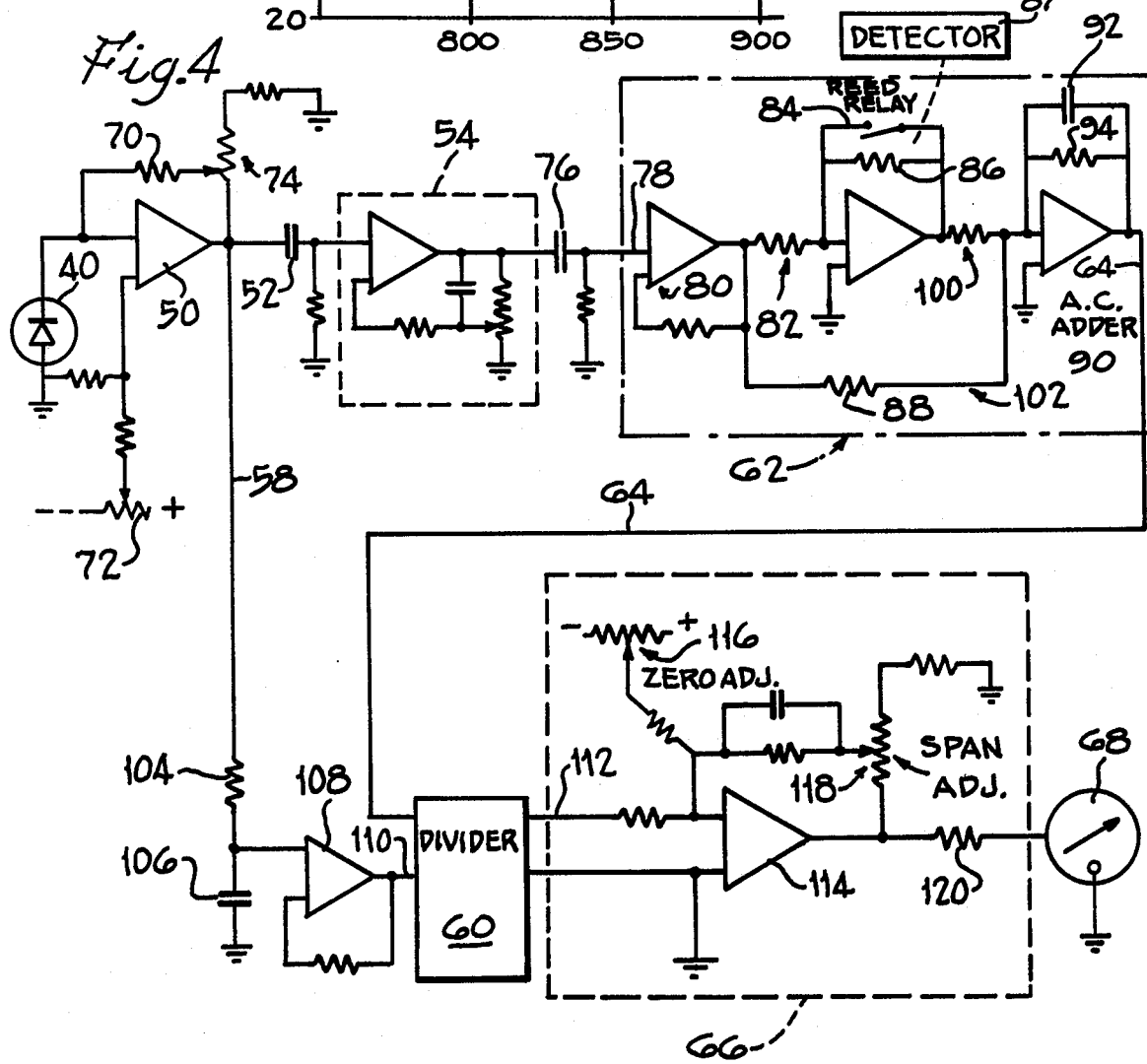
FIG. 4 is an electrical schematic diagram illustrating the particular components of the block diagram as previously shown in FIG. 3.

FIG. 4 illustrates in detail the electrical circuitry utilized to measure the fat content of a meat sample. The circuitry shown in FIG. 4 is an elaboration of the block diagram shown in FIG. 3. The previously discussed operational amplifier 50 has a zero nulling adjustment 72, which is usually adjusted in the factory, to insure a zero read-out at meter 68, when no radiation impinges upon the detector 40. A gain control adjustment 74 is likewise performed in the factory, or when new lamp sources 14, 16 (FIG. 1) are installed. The purpose of the gain adjustment is to make sure a strong signal is presented at the output of the operational amplifier 50, without the effects of saturation. The resistor 70 is connected as a high resistive feed back loop to perform the essential current-voltage conversion in this stage. The previously discussed AC amplifier 54 may be fabricated as a conventional module, such as available from Fairchild, Inc., having model No. 741, as an identification. As will be seen in FIG. 4, a DC blocking capacitor 76 couples the AC signal from amplifier 54 to the synchronous rectifier or detector 62.

Figure 5:
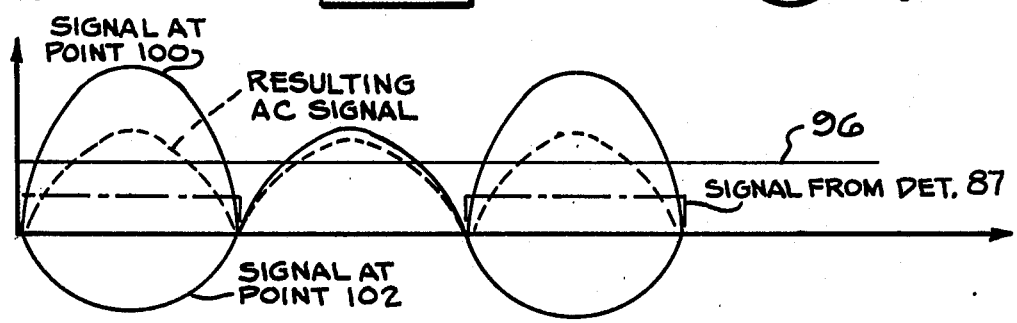
FIG. 5 is a plot showing the rectification of an AC signal as it is processed by the electronics of FIG. 4.

The first stage in the detector 62 is a buffer stage 80 which performs impedence matching between the input at 78 and the output to a second stage 82. The second stage 82 is a gain stage that operates in an AC mode. There is a variation in this gain between 2 and 0, depending upon whether the reed relay 84 is opened or closed. The switching action of the relay is synchronized with the drive shaft 47 and thus the oscillating motion of the mirror assembly arm 44. Synchronization is achieved by axially mounting a light chopper 83 on the shaft 47. The chopper rotates with the shaft and as it does so, light from a source 85 is alternatingly passed and blocked by slits (not shown) in the chopper 83. A detector 87, positioned on an opposite side of the chopper 83 detects the alternating passage and blockage of light. Output leads of the detector 87 carry a square wave signal as indicated in FIG. 5. The generation of such a signal by utilization of a light chopper is conventional in photo-optical instrumentation. As shown in FIG. 4, the output of the detector 87 is connected to the reed relay 84 and during positive excursions of the square wave (FIG. 5) the reed relay switch 84 is opened to produce the above mentioned gain of 2 by the stage 82. During the negative excursions of the square wave (FIG. 5) the reed relay switch 84 is closed thus short circuiting the input and output of the operational amplifier of stage 82 thus resulting in a zero gain by the operational amplifier of stage 82. A resistor 86 is connected in parallel with the reed relay 84 to adjust the gain to 2 when stage 82 is in a state other than gain 0. The output from stage 82 appears along line 100. A parallel by-pass route is generally indicated by reference numeral 102 and consists of a resistor 88 connected between the output of the buffer 80 and the output of the second AC stage 82. Inputs 100 and 102 are provided to a final stage 90 which functions as an AC adder to add the signals presented at inputs 100 and 102. The purpose of the stages 82 and 90 will become apparent shortly. It is to be mentioned that a parallel RC combination of resistor 94 and capacitor 92 smooth the output of the stage 90 so that the effect is a DC level at the output 64.

FIG. 5 demonstrates in plot form the effect of the stages 82 and 90. The signal at input 100 appears as a half wave rectified signal. The input at 102 is not rectified and has a peak that is one half that of the signal at 100. These inputs are processed by the AC adder 90 which performs an algebraic addition of the signals at points 100 and 102. As a result, a full wave rectified signal, having a peak value the same as the signal at 102, exists. However, due to the smoothing action of the RC combination 94, 92, a DC level 96 is generated along the output lead 64 of the stage 90. Thus, it will be appreciated that AC adder 90 has converted an AC signal to its DC equivalent. This has been done so that a division may take place in divider 60, with the AC numerator of the divider 60 actually being a DC signal, for purposes of circuitry processing in the divider 60.

A DC signal is transmitted from the operational amplifier 50 to the divider 60, via a rather sharp RC filter 104, 106 that preceeds an impedance matching buffer 108. The output from the buffer 108 presents a DC signal on lead 110 that drives the DC input of the divider 60. The divider is a component, constituting prior art, and available from such manufacturers as Analog Devices and carries the identification No. 428J. The signal on input line 64 is a DC level proportional to the AC signal that is fed from the adder 90, the signal proportional to the slope of the reflectance curve, in the fat absorption band (FIG. 1). The DC signal on line 110 represents the average reflectance in this band. The output from divider 60 is labeled 112 and carries a resultant DC measurement signal which is fed to the calibration stage 66.

Actually, the calibration stage 66 includes an operational amplifier 114 having a zero adjust 116 connected to a first input thereof. The zero adjust 116 is a gain adjustment that effects a zero read-out on meter 68, when an appropriate zero standard is substituted in lieu of a meat sample. The output from the operational amplifier stage 114 has a second gain adjustment 118, in the form of a span adjustment. The potentiometer adjustment is made when a standard having a known preselected meter reflection is substituted for a meat sample. When the instrument is calibrated the standards are removed and instead, meat is positioned for sampling and investigation. The meter 68 is now calibrated to read-out the fat content directly.

TRANSMITTANCE MODE

Thus far described, the invention has been explained in the manner corresponding with the reflectance mode. However, an alternate embodiment of the invention utilizes the principle of transmittance of light through the meat sample, when the latter is fashioned to a thinness, sufficient to permit the passage of light from the lamp sources 14 and 16 (FIG. 2) therethrough.

A transmittance plot for meat is quite similar to that shown in FIG. 1. The fat and water absorption bands, in the transmittance mode, also occurs at the wavelengths previously indicated for the reflectance mode.

Figure 7:
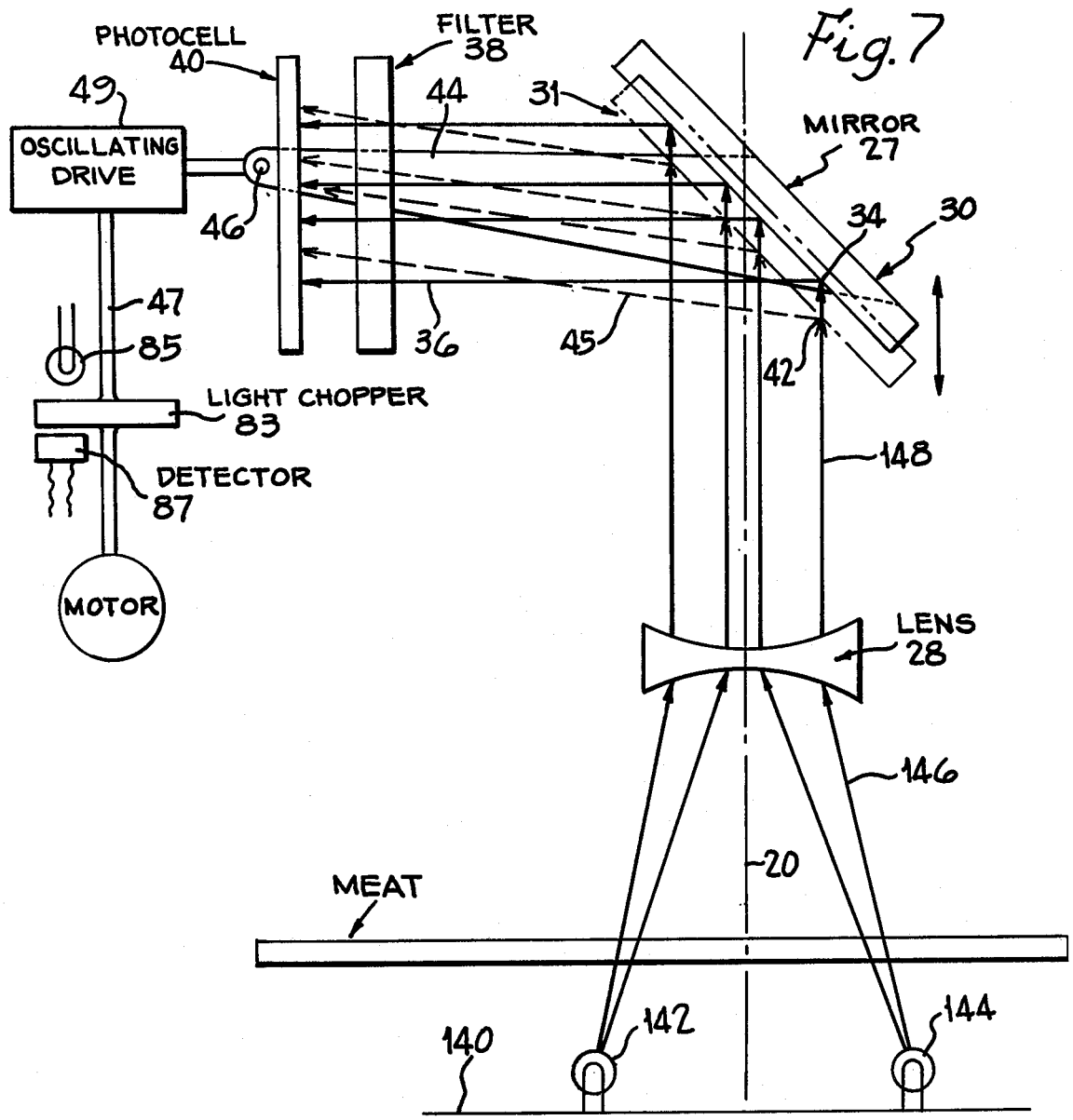
FIG. 7 is a view similar to that of FIG. 2 showing the photo-optical portion of the instrument when used in a transmittance mode.

With respect to the construction of the instrument, as shown in FIG. 2, an instrument operating in the transmittance mode would essentially include the same components as in the case of the reflectance mode (FIG. 2). This is shown in FIG. 7 wherein components similar to both reflectance and transmittance modes are indicated by like numerals for consistancy. As will be noted from FIG. 7, the light sources are disposed underneath a thin meat sample, thus permitting the transmittance of light rays through the sample and subsequently through the lens 28. After the transmitted light passes through the lens 28, the remainder of the system operates identically as described in connection with the reflectance mode. Light sources 142 and 144 are mounted on a support 140. Preferably, an additional pair of light sources (not shown) are symmetrically positioned with respect to the axis 20, and in quadrature relationship with the illustrated sources 142 and 144. Light ray 146 is chosen as a typical ray which is transmitted through the meat sample toward the lens 28. With similar rays from the light sources, the lens 28 collects the rays and projects them as parallel rays 148 toward the mirror 29.

The circuitry of FIG. 3 remains the same for the instrument operating in the transmittance mode. However, the divider 60 produces an output which corresponds to $\Delta T/T$ which is associated with the slope of a plot of transmittance, in the fat absorption band divided by the average value of the transmittance in that band. Actually, as previously explained, the divider 60 performs an energy ratio, namely, $\Delta E_T/E_T$ which is the ratio of the slope of a transmittance plot in the fat absorption band divided by the energy transmitted through the meat, both numerator and denominator of the ratio being in terms of transmitted energy through the meat sample. However, this ratio is proportional to the previous ratio of transmittance. The specific circuitry of FIG. 4 is likewise used in the transmittance mode of operation. However, the divider input lead 64 now carries a $\Delta T$ signal, instead of a $\Delta R$ signal. The input lead 110 now carries a T signal instead of the previously discussed R signal.

Figure 6:
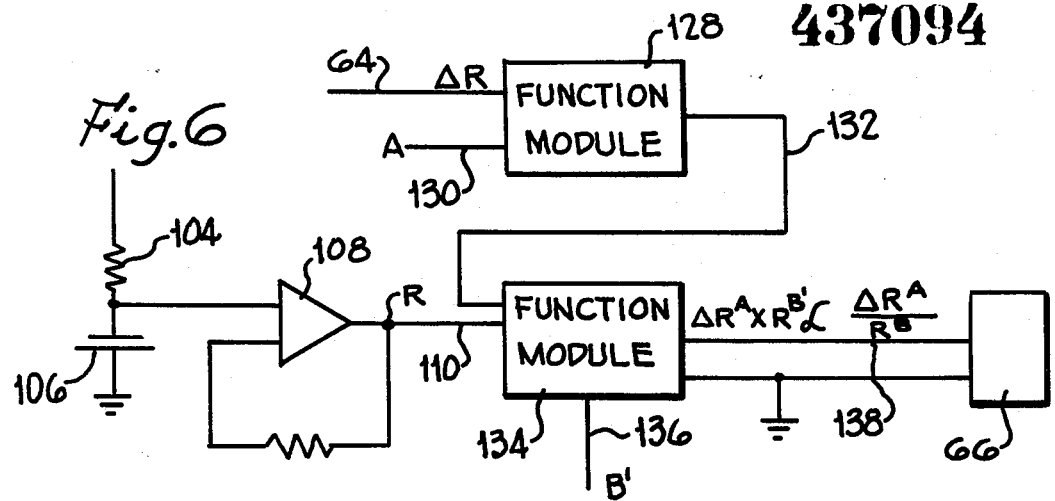
FIG. 6 is a schematic diagram indicating the utilization of function modules in lieu of a divider shown in the embodiment of FIG. 4.

FIG. 6 illustrates the utilization of function modules in lieu of the previously discussed divider 60 (FIG. 3, FIG. 4). The purpose of this circuitry is to generate a reflectance or transmittance ratio input signal to the calibration stage 66, somewhat different from the ratio signal previously discussed. The previous discussion dealt with the ratio $\Delta R/R$ or $\Delta T/T$ for reflectance and transmittance, respectively. As shown in FIG. 6, the newly generated ratio is a ratio of exponential numerator and denominator. It has been found that this alternate circuitry produces readings of greater accuracy than by using the divider 60.

The following discussion explains the circuitry, in connection with a reflectance mode. However, it is to be emphasized that identical circuitry may be used in the transmittance mode.

Referring to FIG. 6, the $\Delta R$ signal is fed to a first input of a function module 128. This module may be of the type manufactured by Analog Devices, Inc., and identified as a model 433 function module. A second input 130 provides a reference that will be reflected as an exponent of $\Delta R$. The output 132 from the function module 128 provides a first input to a second module 134 of identical design to function module 128. The previously mentioned reflectance signal R, on lead 110 provides a second input to the function module 134. Lead 136 provides a reference input (B) which becomes evident as an exponent of the input R. The output of the function module 134 actually performs a multiplication of functions as indicated in the Figure. Actually, the product of functions is equal to $$\Delta R^A \cdot R^{B'} \quad oC \quad \Delta R^A/R^B$$

The resultant signal on lead 138 provides an input to the calibration stage 66 which is the same as previously discussed.

The advantage of utilizing the function modules, as shown in FIG. 6, is that fat content readings of greater accuracy can be derived than with the use of divider 60.

Although the preceeding discussion explained the various embodiments of the invention in terms of a tilting mirror 29 and a stationary filter 38, this relationship may be reversed.

Further, it should be recognized that it is essential that the light impinging upon the filter 38 must do so at varying angles of incidence to achieve the previously discussed scan of the fat absorption band. Thus, if desired, the previously discussed and illustrated embodiments may be changed so that the mirror 29 is eliminated and the oscillating drive be connected to the filter 38 to achieve oscillating tilting thereof. With a reorientation of the filter and associated photo cell 40, along axis 20, the same principle of impinging light upon the filter at varying angles of incidence would result. Such an embodiment would work equally well with the discussed reflectance or transmittance mode. Although such an embodiment represents a decrease in the number of photo-optical components, it is necessary for the oscillating filter 38, in such a construction, to undergo greater oscillating displacements than with the use of mirror 29.

At this point it may be helpful to briefly discuss the relative advantages of the reflectance and transmittance modes when compared to one another. In the reflectance mode, light is reflected from the surface of the meat sample and thus, the sample should be considerably homogeneous. However, the thickness of the sample itself is immaterial. With an instrument operating in the transmittance mode, the light is transmitted through the sample and therefore a greater averaging effect is realized. This means that less care is required, in the preparation of the meat sample with respect to homogeneity. However, because the light must pass through the meat, the sample must be prepared so that it's thin enough to permit transmittance. Accordingly, the particular application involved may determine which mode is preferable.

With each of the embodiments discussed, it is essential that the meat sample be of only one type of meat such as beef, pork, lamb, etc. This is due to the fact that each type of meat requires a separate calibration. Accordingly, the simplified embodiments of the invention presented will not work well with a mixture of meats.

As will be appreciated, the present invention, when packaged as an instrument, offers tremendous advantages of convenience, low cost and reliability, not heretofor realizable. The instrument constructed in conformance with the present invention is small, light, rugged, and fully portable. It may be used for consumers to satisfy themselves that the meat they purchase in a supermarket has a particular fat content. Likewise, it may be used by food inspectors to insure certain meat quality for compliance with standards set by regulations. Further, it may be used by butchers to accurately determine the fat content of ground meat that they are in the process of preparing. The meat department of supermarkets may also employ the instrument of the present invention to measure the fat content of ground meat precisely, for marking on meat packages.

Although the present invention has been described, principally, in terms of measuring meat fat, it is to be emphasized that the present invention may be utilized in measuring other characteristics of other materials. This is due to the fact that the invention relies upon the measurement of certain slope characteristics in absorption bands of material. In the present case, the fat absorption band of meat has been selected. However, this does not imply a restriction of limitation on the present invention for wide variety of measurement applications, on a wide variety of material.

It should be understood that the invention is not limited to the exact details of construction shown and described herein for obvious modifications will occur to persons skilled in the art.

We claim:

1. A method for measuring the fat content of a meat sample comprising the following steps:

illuminating a meat sample with radiation that is then reflected along a predetermined path; systematically changing the wavelength of the reflected radiation over a wavelength band that corresponds to the radiation absorption band of meat fat, at an intermediate point along the path; detecting a varying energy level of the reflected radiation as the wavelength is changed; measuring the change in energy level divided by the average energy level as the wavelength changes; and calibrating the measurement to correspond with the fat content in the sample.

2. A system for measuring fat content of a meat sample comprising:

means for illuminating the sample with radiation in a preselected frequency spectrum; optical interference filter means for filtering the radiation reflected from the sample; means communicating with the filter means for changing the angle of incidence of said reflected radiation impinging upon the filter means, which changes the wavelength of the radiation passing through the filter means, over a frequency band corresponding to the absorption band of meat fat; detector means positioned behind the filter means for generating an electrical signal corresponding to the energy of the radiation in the fat absorption band, as reflected from the sample; means responsive to the detector signal for computing changes in energy level as the radiation wavelength changes divided by the average energy level as the radiation wavelength changes; and means connected to the output of the computing means for calibrating the output of the computing means as a function of fat content.

3. A photo-optical system for determining the fat content in a meat sample, the system comprising:

at least one light source positioned adjacent the sample for illuminating the sample and causing reflections therefrom; lens means positioned adjacent the meat sample for collimating the reflections along a first light path; mirror means interposed at a point along the first light path to divert the reflections along a second light path; interference filter means interposed at a point along the second light path as that the diverted reflections are incident to the filter means; drive means connected to the mirror which continually moves the mirror between two preselected limit positions for changing the angle of incidence of diverted reflections impinging upon the filter means thus changing the wavelength of light passing through the filter over a frequency band, corresponding to the absorption band of meat fat; detector means positioned behind the filter means for detecting the energy associated with the reflections from the meat fat; circuit means connected to the output of the detector means for measuring the change in the energy divided by the average energy, as the light wavelength changes; and means connected to the circuit means for transposing the measurement to a value indicative of the fat content of the sample.

4. The subject matter of claim 3 wherein the light source comprises a plurality of symmetrically positioned lamps for evenly distributing incandescent light to the surface of the sample 5. The structure defined in claim 3 wherein the drive means comprises:

a pivot arm connected between a pivot point and the mirror; and oscillating drive means for alternately swinging the pivot arm between the two limit positions.

6. The structure of claim 3 wherein the circuit means comprises:

divider means having a first input connected in circuit with the detector means and means for integrating the output from the detector means to produce a signal indicative of the average energy, a second input to the divider means connected to a circuit path comprising:

means for rectifying an AC component of the signal derived from the detector means output; converting means connected to the rectifying means for integrating the rectified component to produce a corresponding DC signal; and means connecting the converting means to the second input of the divider means for measuring the change in the energy divided by the average energy, as the light wavelength changes.

7. The subject matter set forth in claim 3 wherein the calibrating means comprises:

adjustable circuit means for producing a signal indicative of a predetermined measurement when a standard sample of known fat content is employed.

8. The circuitry defined in claim 3 together with a meter connected to the output of the calibrating means for providing a visual readout of the fat content.

9. The subject matter set forth in claim 3 wherein the circuit means comprises:

divider means having a first input connected in circuit with the detector means and means for integrating the output from the detector means to produce a signal indicative of the average energy, a second input to the divider connected to a circuit path comprising:

means for coupling an AC component of the detector output; gain control means connected to the output of the coupling means for varying the gain of the AC component in response to the mirror means as the latter travels between the respective limit positions, the gain control means producing a half wave rectified AC signal out of phase with a regular AC signal having one half the peak voltage of the half wave rectified AC signal; means connected to the output of the gain control means for adding the signals to form a full wave rectified signal having peaks of equal amplitude; and means connected to the output of the adding means for integrating the full wave rectified signal and producing a DC level corresponding to the amplitude of the AC component.

10. The subject matter as set forth in claim 3 wherein the circuit means comprises:

a first function module having a first input for carrying the change in the energy ($\Delta R$), a second input of the module connected to a reference "A" for producing an output signal corresponding to $\Delta R^A$; a second function module having a first input connected to the output signal from the first function module, a second input of the second module carrying the average energy (R), a third input to the second module connected to a reference B' for producing an output signal $\Delta R^A \cdot R^{B'}$ which is proportional to $\Delta R^A/R^B$.

11. A method for measuring the fat content of a meat sample comprising the following steps:

illuminating a meat sample with radiation transmitted therethrough; systematically changing the wavelength of the transmitted radiation over a wavelength band that corresponds to the radiation absorption band of meat fat, at an intermediate point along the path; detecting a varying energy level of the transmitted radiation as the wavelength is changed; measuring the change in energy level divided by the average energy level as the wavelength changes; and calibrating the measurement to correspond with the fat content in the sample.

12. A system for measuring fat content of a meat sample comprising:

means for illuminating the sample with transmitted radiation in a preselected frequency spectrum; optical interference filter means for filtering the radiation transmitted through the sample; means communicating with the filter means for changing the angle of incidence of said transmitted radiation impinging upon the filter means, which changes the wavelength of the radiation passing through the filter means, over a frequency band corresponding to the absorption band of meat fat; detector means positioned behind the filter means for generating an electrical signal corresponding to the energy of the radiation in the fat absorption band, as transmitted through the sample; means responsive to the detector signal for computing changes in energy level as the radiation wavelength changes divided by the average energy level as the radiation wavelength changes; and means connected to the output of the computing means for calibrating the output of the computing means as a function of fat content.

13. A photo-optical system for determining the fat content in a meat sample, the system comprising:
at least one light source positioned adjacent one side of the sample for illuminating the sample and causing light transmittance therethrough; lens means positioned adjacent a second side of the meat sample for collimating the transmittance along a first light path; mirror means interposed at a point along the first light path to divert the transmittance along a second light path; interference filter means interposed at a point along the second light path so that the diverted transmittance is incident to the filter means; drive means connected to the mirror which continually moves the mirror between two preselected limit positions for changing the angle of incidence of diverted transmittance impinging upon the filter means thus changing the wavelength of light passing through the filter over a frequency band, corresponding to the absorption band of meat fat; detector means positioned behind the filter means for detecting the energy associated with the transmittance from the meat fat; circuit means connected to the output of the detector means for measuring the change in the energy divided by the average energy, as the light wavelength changes; and means connected to the circuit means for transposing the measurement to a value indicative of the fat content of the sample.

14. The subject matter of claim 13 wherein the light source comprises a plurality of symmetrically positioned lamps for evenly distributing incandescent light to the surface of the sample.

15. The structure defined in claim 13 wherein the drive means comprises:
a pivot arm connected between a pivot point and the mirror; and oscillating drive means for alternately swinging the pivot arm between the two limit positions.

16. The structure claim 13 wherein the circuit means comprises:
divider means having a first input connected in circuit with the detector means and means for integrating the output from the detector means to produce a signal indicative of the average energy, a second input to the divider means connected to a circuit path comprising; means for rectifying an AC component of the signal derived from the detector means output; converting means connected to the rectifying means for integrating the rectified component to produce a corresponding DC signal; and means connecting the converting means to the second input of the divider means for measuring the change in the energy divided by the average energy, as the light wavelength changes.

17. The subject matter set forth in claim 13 wherein the calibrating means comprises:
adjustable circuit means for producing a signal indicative of a predetermined measurement when a standard sample of known fat content is employed.

18. The circuitry defined in claim 13 together with a meter connected to the output of the calibrating means for providing a visual readout of the fat content.

19. The subject matter set forth in claim 13 wherein the circuit means comprises:
divider means having a first input connected in circuit with the detector means and means for integrating the output from the detector means to produce a signal indicative of the average energy, a second input to the divider connected to a circuit path comprising: means for coupling an AC component of the detector output; gain control means connected to the output of the coupling means for varying the gain of the AC component in response to the mirror means as the later travels between the respective limit positions, the gain control means producing a half wave rectified AC signal out of phase with a regular AC signal having one half the peak voltage of the half wave rectified AC signal; means connected to the output of the gain control means for adding the signals to form a full wave rectified signal having peaks of equal amplitude; and means connected to the output of the adding means for integrating the full wave rectified signal and producing a DC component.

20. The subject matter as set forth in claim 13 wherein the circuit means comprises:
a first function module having a first input for carrying the change in the energy ($\alpha T$), a second input of the module connected to a reference "A" for producing an output signal corresponding to ($\Delta T^4$); a second function module having a first input connected to the output signal from the first function module, a second input of the second module carrying the average energy (T), a third input to the second module connected to a reference $B'$ for producing an output signal $\Delta T - T^{B'}$ which is proportional to $\Delta T^4/T^B$.

* * * * *